(12) United States Patent
Rafii et al.

(10) Patent No.: US 9,165,368 B2
(45) Date of Patent: Oct. 20, 2015

(54) METHOD AND SYSTEM TO SEGMENT DEPTH IMAGES AND TO DETECT SHAPES IN THREE-DIMENSIONALLY ACQUIRED DATA

(75) Inventors: Abbas Rafii, Palo Alto, CA (US); Salih Burak Gokturk, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/219,349

(22) Filed: Aug. 26, 2011

(65) Prior Publication Data

US 2011/0311101 A1 Dec. 22, 2011

Related U.S. Application Data

(63) Continuation of application No. 11/349,311, filed on Feb. 6, 2006, now Pat. No. 8,009,871.

(60) Provisional application No. 60/651,094, filed on Feb. 8, 2005.

(51) Int. Cl.
*G06K 9/00* (2006.01)
*G06K 9/46* (2006.01)
(Continued)

(52) U.S. Cl.
CPC .......... *G06T 7/0081* (2013.01); *G06K 9/00201* (2013.01); *G06T 2207/10028* (2013.01); *G06T 2207/20148* (2013.01); *G06T 2207/30261* (2013.01)

(58) Field of Classification Search
None
See application file for complete search history.

(56) References Cited

U.S. PATENT DOCUMENTS 3,610,754 A 10/1971 Pirlet
3,857,022 A 12/1974 Rebane et al.
(Continued)

FOREIGN PATENT DOCUMENTS

DE 29802435 U1 6/1998
EP 0233464 A1 8/1987
(Continued)

OTHER PUBLICATIONS

Cheng et al., "A hierarchical approach to color image segmentation using homogeneity," Image Processing, IEEE Transactions on Image Processing, IEEE, vol. 9, Issue 12, pp. 2071-2082.
(Continued)

*Primary Examiner* — Thomas Conway
(74) *Attorney, Agent, or Firm* — Ben Tabor; Kate Drakos; Micky Minhas

(57) ABSTRACT

A method and system analyzes data acquired by image systems to more rapidly identify objects of interest in the data. In one embodiment, z-depth data are segmented such that neighboring image pixels having similar z-depths are given a common label. Blobs, or groups of pixels with a same label, may be defined to correspond to different objects. Blobs preferably are modeled as primitives to more rapidly identify objects in the acquired image. In some embodiments, a modified connected component analysis is carried out where image pixels are pre-grouped into regions of different depth values preferably using a depth value histogram. The histogram is divided into regions and image cluster centers are determined. A depth group value image containing blobs is obtained, with each pixel being assigned to one of the depth groups.

20 Claims, 8 Drawing Sheets

(51) Int. Cl.
*G06K 9/66* (2006.01)
*G06K 9/62* (2006.01)
*G06K 9/34* (2006.01)
*G06K 9/38* (2006.01)
*G06T 7/00* (2006.01)

(56) References Cited

U.S. PATENT DOCUMENTS

| | | |
|---|---|---|
| 4,187,492 A | 2/1980 | Delignieres |
| 4,294,544 A | 10/1981 | Altschuler et al. |
| 4,312,053 A | 1/1982 | Lipsky |
| 4,333,170 A | 6/1982 | Mathews et al. |
| 4,376,301 A | 3/1983 | Roberts et al. |
| 4,541,722 A | 9/1985 | Jenks |
| 4,686,655 A | 8/1987 | Hyatt |
| 4,688,933 A | 8/1987 | Lapeyre et al. |
| 4,716,542 A | 12/1987 | Peltz et al. |
| 4,956,824 A | 9/1990 | Sindeband et al. |
| 4,980,870 A | 12/1990 | Spivey et al. |
| 4,986,662 A | 1/1991 | Bures |
| 5,003,166 A | 3/1991 | Girod |
| 5,022,081 A | 6/1991 | Hirose et al. |
| 5,056,791 A | 10/1991 | Poillon et al. |
| 5,099,456 A | 3/1992 | Wells |
| 5,102,223 A | 4/1992 | Uesugi et al. |
| 5,166,905 A | 11/1992 | Currie |
| 5,174,759 A | 12/1992 | Preston et al. |
| 5,381,235 A | 1/1995 | Inoue et al. |
| 5,442,573 A | 8/1995 | Bredberg et al. |
| 5,454,043 A | 9/1995 | Freeman |
| 5,573,077 A | 11/1996 | Knowles et al. |
| 5,617,371 A | 4/1997 | Williams |
| 5,733,031 A | 3/1998 | Lin |
| 5,802,208 A | 9/1998 | Podilchuk et al. |
| 5,825,033 A | 10/1998 | Barrett et al. |
| 5,835,616 A | 11/1998 | Lobo et al. |
| 5,842,194 A | 11/1998 | Arbuckle |
| 5,946,407 A | 8/1999 | Bamberger et al. |
| 5,969,822 A | 10/1999 | Fright et al. |
| 5,983,147 A | 11/1999 | Krumm |
| 6,002,435 A | 12/1999 | Yamamoto et al. |
| 6,005,958 A | 12/1999 | Farmer et al. |
| 6,075,605 A | 6/2000 | Futamura et al. |
| 6,108,437 A | 8/2000 | Lin |
| 6,111,517 A | 8/2000 | Atick et al. |
| 6,137,896 A | 10/2000 | Chang et al. |
| 6,188,777 B1 | 2/2001 | Darrell et al. |
| 6,195,104 B1 | 2/2001 | Lyons |
| 6,252,598 B1 | 6/2001 | Segen |
| 6,266,048 B1 | 7/2001 | Carau, Sr. |
| 6,281,878 B1 | 8/2001 | Montellese |
| 6,325,414 B2 | 12/2001 | Breed et al. |
| 6,412,813 B1 | 7/2002 | Breed et al. |
| 6,421,042 B1 | 7/2002 | Omura et al. |
| 6,422,595 B1 | 7/2002 | Breed et al. |
| 6,463,163 B1 | 10/2002 | Kresch |
| 6,480,616 B1 | 11/2002 | Hata et al. |
| 6,526,161 B1 | 2/2003 | Yan |
| 6,564,144 B1 | 5/2003 | Cherveny |
| 6,580,496 B2 * | 6/2003 | Bamji et al. .......... 356/5.1 |
| 6,614,422 B1 | 9/2003 | Rafii et al. |
| 6,650,318 B1 | 11/2003 | Arnon |
| 6,681,031 B2 | 1/2004 | Cohen et al. |
| 6,690,357 B1 | 2/2004 | Dunton et al. |
| 6,710,770 B2 | 3/2004 | Tomasi et al. |
| 6,734,879 B2 | 5/2004 | Hasha et al. |
| 6,788,809 B1 * | 9/2004 | Grzeszczuk et al. ....... 382/154 |
| 6,791,700 B2 | 9/2004 | Omura et al. |
| 6,801,662 B1 | 10/2004 | Owechko et al. |
| 6,804,396 B2 | 10/2004 | Higaki et al. |
| 6,961,443 B2 | 11/2005 | Mahbub |
| 7,003,134 B1 | 2/2006 | Covell et al. |
| 7,003,136 B1 | 2/2006 | Harville |
| 7,095,881 B2 | 8/2006 | Lelong et al. |
| 8,009,871 B2 | 8/2011 | Rafii et al. |
| 8,166,421 B2 | 4/2012 | Magal et al. |
| 8,429,334 B2 | 4/2013 | Ou |
| 2001/0015123 A1 | 8/2001 | Nishitani et al. |
| 2001/0043719 A1 | 11/2001 | Harakawa et al. |
| 2002/0024676 A1 | 2/2002 | Fukuzaki |
| 2002/0140949 A1 | 10/2002 | Sasaki et al. |
| 2003/0048930 A1 | 3/2003 | Mihara et al. |
| 2003/0156756 A1 | 8/2003 | Gokturk et al. |
| 2003/0169906 A1* | 9/2003 | Gokturk et al. .............. 382/115 |
| 2004/0153229 A1 | 8/2004 | Gokturk et al. |
| 2005/0058322 A1 | 3/2005 | Farmer et al. |
| 2005/0135680 A1* | 6/2005 | Kanade et al. .............. 382/203 |
| 2006/0056689 A1 | 3/2006 | Wittebrood et al. |
| 2009/0183125 A1 | 7/2009 | Magal et al. |
| 2009/0285357 A1 | 11/2009 | Khamene et al. |

FOREIGN PATENT DOCUMENTS

| | | |
|---|---|---|
| EP | 0370770 A1 | 5/1990 |
| EP | 0420500 A1 | 4/1991 |
| EP | 0626636 A2 | 11/1994 |
| EP | 0629964 A1 | 12/1994 |
| EP | 0982676 A1 | 3/2000 |
| EP | 1039365 A2 | 9/2000 |
| EP | 1045586 A2 | 10/2000 |
| GB | 1073503 A | 6/1967 |
| WO | 8400427 A1 | 2/1984 |
| WO | 9721183 A1 | 6/1997 |
| WO | 0019705 A1 | 4/2000 |
| WO | 0021024 A1 | 4/2000 |
| WO | 0221502 A1 | 3/2002 |

OTHER PUBLICATIONS

Office Action dated Mar. 4, 2009, U.S. Appl. No. 11/349,311, filed Feb. 6, 2006.
Response to Office Action dated Jul. 7, 2009, U.S. Appl. No. 11/349,311, filed Feb. 6, 2006.
Final Office Action dated Nov. 12, 2009, U.S. Appl. No. 11/349,311, filed Feb. 6, 2006.
Response to Office Action dated Mar. 16, 2010, U.S. Appl. No. 11/349,311, filed Feb. 6, 2006.
Office Action dated Apr. 27, 2010, U.S. Appl. No. 11/349,311, filed Feb. 6, 2006.
Response to Office Action dated Sep. 24, 2010, U.S. Appl. No. 11/349,311, filed Feb. 6, 2006.
Final Office Action dated Oct. 14, 2010, U.S. Appl. No. 11/349,311, filed Feb. 6, 2006.
Response to Office Action dated Dec. 6, 2010, U.S. Appl. No. 11/349,310, filed Feb. 6, 2006.
Advisory Action dated Dec. 14, 2010, U.S. Appl. No. 11/349,311, filed Feb. 6, 2006.
Request for Reconsideration re Advisory Action dated Dec. 22, 2010, U.S. Appl. No. 11/349,311, filed Feb. 6, 2006.
Advisory Action dated Jan. 20, 2011, U.S. Appl. No. 11/349,311, filed Feb. 6, 2006.
Response to Office Action dated Apr. 14, 2011, U.S. Appl. No. 11/349,311, filed Feb. 6, 2006.
Notice of Allowance and Fee(s) Due dated Apr. 25, 2011, U.S. Appl. No. 11/349,311, filed Feb. 6, 2006.
Non-Final Office Action dated Sep. 9, 2013 re U.S. Appl. No. 13/665,481, 18 pages.
A.E. Savaki et al., "Restoration of Real Defocused Images Using Blur Models Based on Geometrical and Diffraction Optics," 1991, IEEE, pp. 919-922.
Ren C. Luo et al., "Defocusing Blur Restoration in Natural Scene Images for Factual Analysis," Nov. 15, 1993, IEEE, pp. 1377-1381.
Non-Final Office Action mailed Jul. 17, 2013 re U.S. Appl. No. 12/074,443 27 pgs.
Non-Final Office Action mailed Aug. 2, 2013 re U.S. Appl. No. 13/665,471 29 pgs.
Final Office Action dated Mar. 20, 2014 in U.S. Appl. No. 13/665,481, 11 pages.
Final Office Action dated May 23, 2014 in U.S. Appl. No. 13/665,471, 12 pages.

(56) References Cited

OTHER PUBLICATIONS

Non-Final Office Action dated Jul. 29, 2014 in U.S. Appl. No. 12/074,443, 15 pages.
Non-Final Office Action dated Aug. 15, 2014 in U.S. Appl. No. 13/665,481, 13 pages.
Final Office Action dated Feb. 18, 2015 in U.S. Appl. No. 12/074,443, 14 pages.
Non-Final Office Action dated Feb. 24, 2015 in U.S. Appl. No. 13/665,471, 11 pages.

* cited by examiner

```
LabelNo = 0;

For r=1 to number of rows in the image

For c=1 to number of columns in the image

If (PixelValue(r,c)==white)

LabelValue(r,c)=0;

If (PixelValue(r,c)== PixelValue(r,c-1))

LabelValue(r,c)= LabelValue(r,c-1)

Else If (PixelValue(r,c)== PixelValue(r-1,c))

LabelValue(r,c)= LabelValue(r-1,c))

Else

LabelValue(r,c)= LabelNo+1.

LabelNo = LabelNo+1.

End

If (PixelValue(r-1,c)== PixelValue (r,c-1))

Assign LabelValue(r-1,c) and

LabelValue(r,c-1) as connected labels.

End

End

End

Assign the connected labels as the same label.
```

FIG. 5

```
LabelNo = 0;

For r=1 to number of rows in the image

For c=1 to number of columns in the image

LabelValue(r,c)=0;

If (|PixelValue(r,c)-PixelValue(r,c-1)|<Threshold)

LabelValue(r,c)= LabelValue(r,c-1)

Else If (| PixelValue(r,c)-PixelValue(r-1,c)|<Threshold)

LabelValue(r,c)= LabelValue(r-1,c)

Else

LabelValue(r,c)= LabelNo+1.

LabelNo = LabelNo+1.

End

If (|PixelValue(r,c-1)-PixelValue(r -1,c) |<Threshold)

Assign LabelValue(r-1,c) and LabelValue(r,c-1)

as connected labels.

End

End

End

Assign the connected labels as the same label.
```

FIG. 6

```
LabelNo = 0;

For r=1 to number of rows in the image

For c=1 to  number of columns in the image

LabelValue(r,c)=0;

If (depthGroupValue(r,c)== depthGroupValue(r,c-1))

LabelValue(r,c)= LabelValue(r,c-1))

Else If(depthGroupValue(r,c)== depthGroupValue(r-1,c))

LabelValue(r,c)= LabelValue(r-1,c).

Else

LabelValue(r,c)= LabelNo+1.

LabelNo = LabelNo+1.

End if

If (depthGroupValue(r,c-1)==depthGroupValue(r-1,c))

Assign LabelValue(r-1,c) and LabelValue(r,c-1)

as connected labels.

End

End

End

Assign the connected labels as the same label.
```

FIG. 7

METHOD AND SYSTEM TO SEGMENT DEPTH IMAGES AND TO DETECT SHAPES IN THREE-DIMENSIONALLY ACQUIRED DATA

CROSS-REFERENCES TO RELATED APPLICATIONS

This application is a continuation application of U.S. patent application Ser. No. 11/349,311, filed on Feb. 6, 2006, which claims the benefit of U.S. provisional patent application No. 60/651,094, filed Feb. 8, 2005, both of which are incorporated herein by reference in its entirety.

BACKGROUND OF THE INVENTION

Field of the Invention

The invention relates generally to recognizing objects acquired in three-dimensionally acquired data, including data acquired from image sensors, for example depth or range finders, image mapping sensors, three-dimensional image capture sensors including capture of images with color perception not limited by human color perception.

Electronic camera and range sensor systems that provide a measure of distance from the system to a target object are known in the art. Many such systems approximate the range to the target object based upon luminosity or brightness information obtained from the target object. Some such systems are passive and respond to ambient light reflected from the target object, while other systems emit and then detect emitted light reflected from the target object. However luminosity-based systems may erroneously yield the same measurement information for a distant target object that happens to have a shiny surface and is thus highly reflective, as for a target object that is closer to the system but has a dull surface that is less reflective.

A more accurate distance measuring system is a so-called time-of-flight (TOF) system. FIG. 1 depicts an exemplary TOF system, as described in U.S. Pat. No. 6,323,942 entitled CMOS-Compatible Three-Dimensional Image Sensor IC (2001), which patent is incorporated herein by reference as further background material. TOF system 100 can be implemented on a single IC 110, without moving parts and with relatively few off-chip components. System 100 includes a two-dimensional array 130 of pixel detectors 140, each of which has dedicated circuitry 150 for processing detection charge output by the associated detector. In a typical application, array 130 might include 100×100 pixels 230, and thus include 100×100 processing circuits 150. IC 110 also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations.

Under control of microprocessor 160, a source of optical energy 120 is periodically energized and emits optical energy via lens 125 toward an object target 20. Typically the optical energy is light, for example emitted by a laser diode or LED device 120. Some of the emitted optical energy will be reflected off the surface of target object 20, and will pass through an aperture field stop and lens, collectively 135, and will fall upon two-dimensional array 130 of pixel detectors 140 where an image is formed. Each imaging pixel detector 140 measures both intensity or amplitude of the optical energy received, and the phase-shift of the optical energy as it travels from emitter 120, through distance Z to target object 20, and then distance again back to imaging sensor array 130. For each pulse of optical energy transmitted by emitter 120, a three-dimensional image of the visible portion of target object 20 is acquired.

Emitted optical energy traversing to more distant surface regions of target object 20 before being reflected back toward system 100 will define a longer time-of-flight than radiation falling upon and being reflected from a nearer surface portion of the target object (or a closer target object). For example the time-of-flight for optical energy to traverse the roundtrip path noted at t1 is given by $t1=2\cdot Z1/C$, where C is velocity of light. A TOF sensor system can acquire three-dimensional images of a target object In real time. Such systems advantageously can simultaneously acquire both luminosity data (e.g., signal amplitude) and true TOF distance measurements of a target object or scene.

As described in U.S. Pat. No. 6,323,942, in one embodiment of system 100 each pixel detector 140 has an associated high speed counter that accumulates clock pulses in a number directly proportional to TOF for a system-emitted pulse to reflect from an object point and be detected by a pixel detector focused upon that point. The TOF data provides a direct digital measure of distance from the particular pixel to a point on the object reflecting the emitted pulse of optical energy. In a second embodiment, in lieu of high speed clock circuits, each pixel detector 140 is provided with a charge accumulator and an electronic shutter. The shutters are opened when a pulse of optical energy is emitted, and closed thereafter such that each pixel detector accumulates charge as a function of return photon energy falling upon the associated pixel detector. The amount of accumulated charge provides a direct measure of round-trip TOF. In either embodiment, TOF data permits reconstruction of the three-dimensional topography of the light-reflecting surface of the object being imaged.

Many factors, including ambient light, can affect reliability of data acquired by TOF systems. As a result, the transmitted optical energy may be emitted multiple times using different systems settings to increase reliability of the acquired TOF measurements. For example, the initial phase of the emitted optical energy might be varied to cope with various ambient and reflectivity conditions. The amplitude of the emitted energy might be varied to increase system dynamic range. The exposure duration of the emitted optical energy may be varied to increase dynamic range of the system. Further, frequency of the emitted optical energy may be varied to improve the unambiguous range of the system measurements.

U.S. Pat. No. 6,580,496 entitled Systems for CMOS-Compatible Three-Dimensional Image-Sensing Using Quantum Efficiency Modulation (2003) discloses a sophisticated system in which relative phase ($\phi$) shift between the transmitted light signals and signals reflected from the target object is examined to acquire distance z. Detection of the reflected light signals over multiple locations in a pixel array results in measurement signals that are referred to as depth images. FIG. 2A depicts a system 100' according to the '496 patent, in which an oscillator 115 is controllable by microprocessor 160 to emit high frequency (perhaps 200 MHz) component periodic signals, ideally representable as $A\cdot\cos(\omega t)$. Emitter 120 transmitted optical energy having low average and peak power in the tens of mW range, which emitted signals permitted use of inexpensive light sources and simpler, narrower bandwidth (e.g., a few hundred KHz) pixel detectors 140'. Unless otherwise noted, elements in FIG. 2A with like reference numerals to elements in FIG. 1 may be similar or identical elements.

In system 100' there will be a phase shift φ due to the time-of-flight (TOF) required for energy transmitted by emitter 120 ($S_1$=cos(ωt)) to traverse distance z to target object 20, and the return energy detected by a photo detector 140' in array 130', $S_2$=A·cos(ωt+φ), where A represents brightness of the detected reflected signal and may be measured separately using the same return signal that is received by the pixel detector. FIGS. 2B and 2C depict the relationship between phase shift φ and time-of-flight, again assuming for ease of description a sinusoidal waveform.

The phase shift φ due to time-of-flight is:

$$\phi=2\cdot\omega\cdot z/C=2\cdot(2\pi f)\cdot z/C$$

where C is the speed of light 300,000 Km/sec. Thus, distance z from energy emitter (and from detector array) to the target object is given by:

$$z=\phi\cdot C/2\omega=\phi\cdot C/\{2\cdot(2\pi f)\}$$

As noted above, many types of three-dimensional imaging systems are known in the art. But even if reasonably accurate depth images can be acquired by such systems. Further, it can be important to rapidly analyze the acquired data to discern whether objects are present that may require immediate response. For example, systems such as described in the '496 patent may be used as robotic sensors to determine whether certain objects are nearby whose presence may dictate the immediate shut-down of equipment for safety reasons. Systems including systems described in the '496 patent may be used within motor vehicle to help the vehicle operator quickly recognize objects whose presence may require immediate response, e.g., braking to avoid hitting pedestrians in the vehicle's path.

What is needed is a method and system useable with existing image acquisition systems to more rapidly and more reliably identify objects within the acquired data whose presence may dictate certain responses. The present invention provides such methods and systems.

SUMMARY OF THE INVENTION

The present invention is usable with systems that acquire depth images, and provides methods and systems to analyze such images. The present invention segments the images to detect shapes or so-called blobs therein to help rapidly identify objects in the acquired image. The present invention can be practiced on depth images, without regard to whether they were acquired with so-called stereographic cameras, laser range sensors, time-of-flight sensors, or with more sophisticated imaging systems, such as time-of-flight systems exemplified by U.S. Pat. No. 6,323,942, or phase-shift systems exemplified by U.S. Pat. No. 6,580,496.

In one aspect, the acquired depth or range image is segmented into groups of objects that are logically connected within the image. For example intensity-based pixels, perhaps acquired with a conventional camera, may be labeled according to color. More preferably, pixels acquired from a true z-depth measuring system are labeled such that logically connected pixels are assigned the same depth or z-value. Logical connectivity can relate to various characteristics of the acquired image. For example, with an intensity-based image such as acquired by a conventional camera, pixels can be labeled according to color. An image of a human wearing black pants and a red shirt could be separated into two sub-images. However a problem common with intensity-based images is that if there is occlusion or overlap between objects in the image, the grouping or segmentation may be unsuccessful as there is no true depth perception.

As applied to true z-depth data images, segmenting according to an embodiment of the present invention is such that neighboring pixels in the image that have similar depths are given a common label. As used herein, "blobs" may be constructed from the labeled image, where a "blob" is a group of pixels having the same label. Preferably each blob will correspond to a different object, and blobs can be modeled as primitives of different shapes (e.g., a circle, a rectangle, etc.), or as pre-defined objects, e.g., a motor vehicle, a human, an animal.

Using embodiments of a modified connected component analysis, the present invention can recognize the presence of blobs within an image, to more rapidly correctly characterize the image. In some embodiments, image pixels are pre-grouped into regions of different depth values, preferably using a depth value histogram, which is itself divided into regions. Image cluster centers can then be determined and a depth group value image obtained, in which each pixel is assigned to one of the depth groups. Such modified connected component analysis is then carried out to identify blobs or objects within the image data. Blob classes may be defined for the application at hand, to help rapidly identify objects in the acquired image. For example, when used with a system in a motor vehicle to identify potential driving hazards, one class of blobs may be characterize pedestrians, other vehicles, and the like.

Other features and advantages of the invention will appear from the following description in which the preferred embodiments have been set forth in detail, in conjunction with their accompanying drawings.

BRIEF DESCRIPTION OF THE DRAWINGS

FIG. 5 depicts exemplary pseudocode implementing a two-way neighborhood grouping by which connected black or white pixels are assigned a same black or white label, according to an embodiment of the present invention;

FIG. 6 depicts exemplary pseudocode implementing a modified connected component analysis by which depth values of pixels are implemented and neighboring pixels with similar depth values are assigned a same label, according to an embodiment of the present invention;

FIG. 7 depicts exemplary pseudocode implementing a method in which where pixels are pre-grouped into regions of different depth values using a histogram of depth values, according to an embodiment of the present invention.

DETAILED DESCRIPTION OF THE INVENTION

Figure 1:
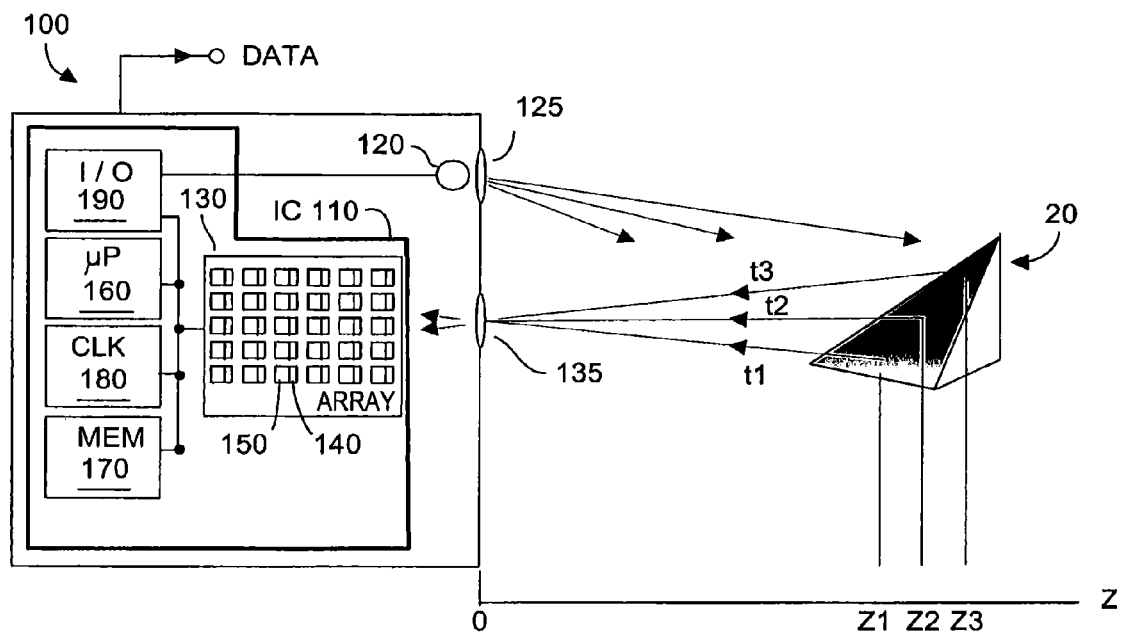
FIG. 1 is a diagram showing a time-of-flight range finding system, according to the prior art.
Figure 2A:
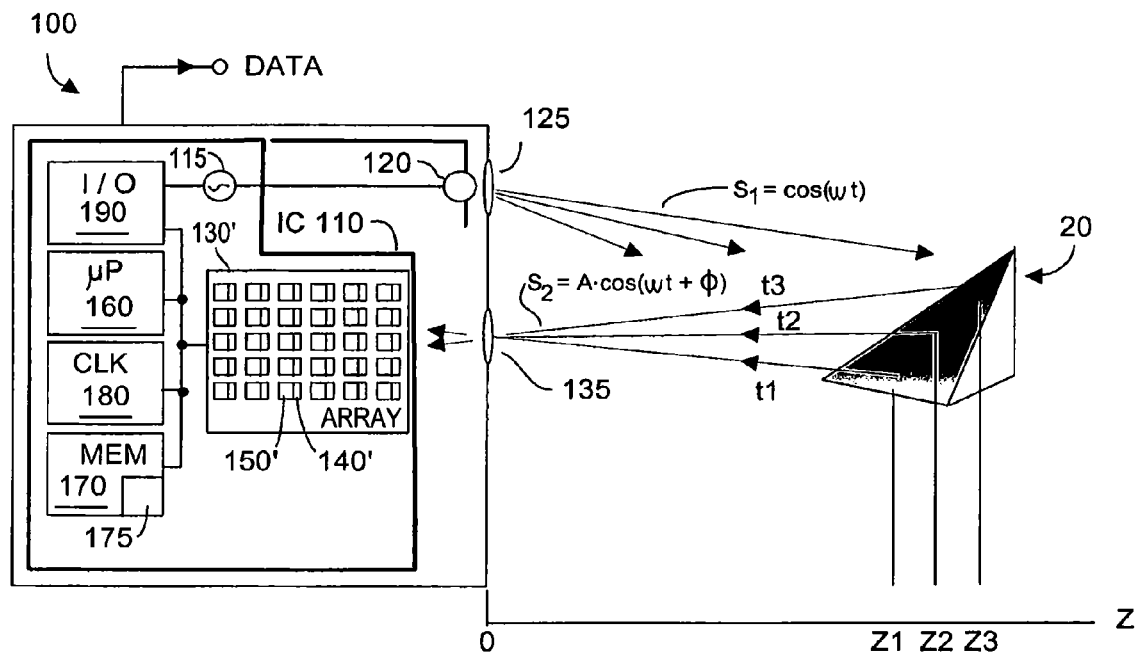
FIG. 2A depicts a phase-shift intensity and range finding system, according to the prior art.
Figure 2B:
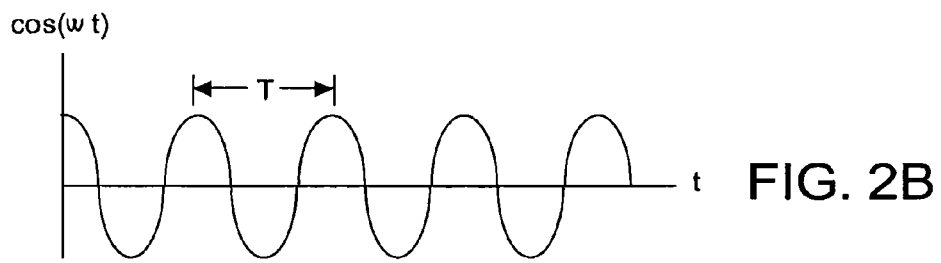
FIG. 2B depicts a transmitted periodic signal with high frequency components transmitted by the system of FIG. 2A, according to the prior art.
Figure 2C:
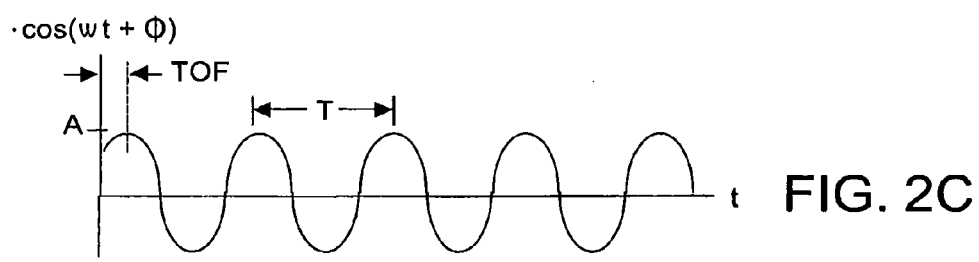
FIG. 2C depicts the return waveform with phase-delay for the transmitted signal of FIG. 2B, according to the prior art.
Figure 3:
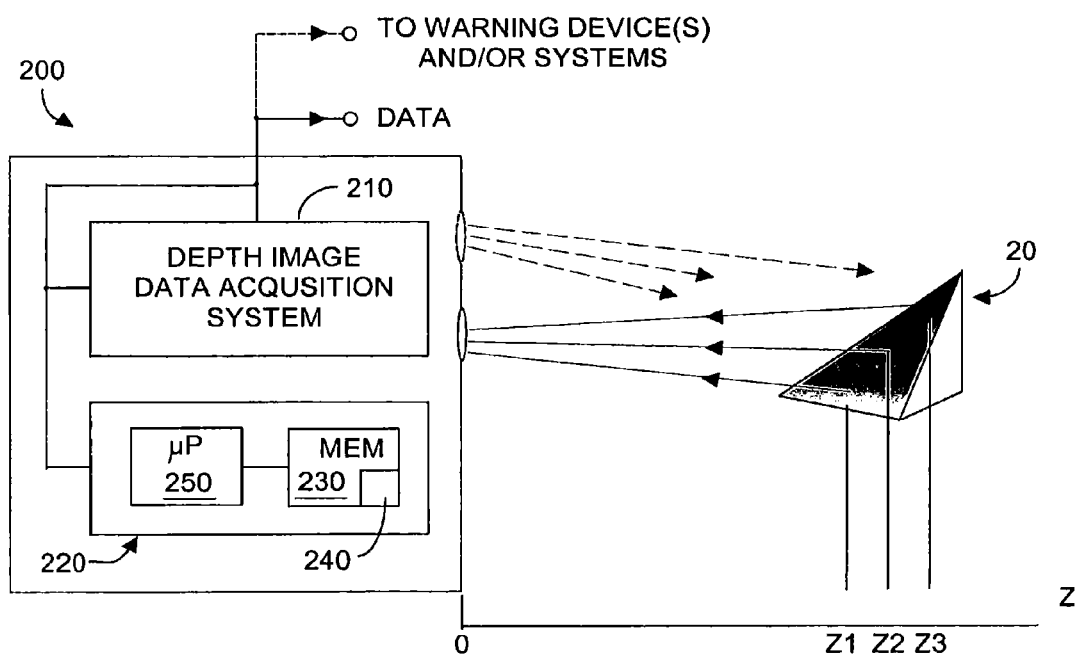
FIG. 3 depicts a generic image-acquisition system provided with a segmenter-image recognizer system, according to an embodiment of the present invention.

FIG. 3 depicts a three-dimensional imaging system 200' comprising a depth image data acquisition system 210, and a segmenter-image recognizer system 220, according to the present invention. Depth image data acquisition system 210 may be almost any system that acquires images with three-dimensional depth data. As such system 210 could include time-of-flight systems such as shown in FIG. 1, phase-shift detection systems such as shown in FIG. 2A, laser range sensors, and stereographic camera systems, among other. As such, energy emanating from system 200 is drawn with phantom lines to denote that system 200 may not actively emit optical energy but instead rely upon passive optical energy from ambient light.

System 210 may be implemented in many ways and can, more or less, provide a stream of output information (DATA) that includes a measure of distance z to a target object 20. Such DATA may include information as to target objects that might not be readily identifiable from the raw information. However, according to the present invention, segmenter-image recognizer system 220 can process the information stream using an algorithmic procedure 240 stored in memory 230, and executable by a microprocessor 250. If depth image data acquisition system 210 is implemented according to the systems of FIG. 1 or FIG. 2A, functions of some or all elements of segmenter-image recognizer system 220 may be provided elsewhere. For example, processing tasks of microprocessor 250 in FIG. 3 may in fact be carried out by microprocessor 160 in FIG. 1 or FIG. 2A, and/or storage facilities provided by memory 230 in FIG. 3 may be carried out by memory 170 in FIG. 1 or FIG. 2A.

Figure 4A:
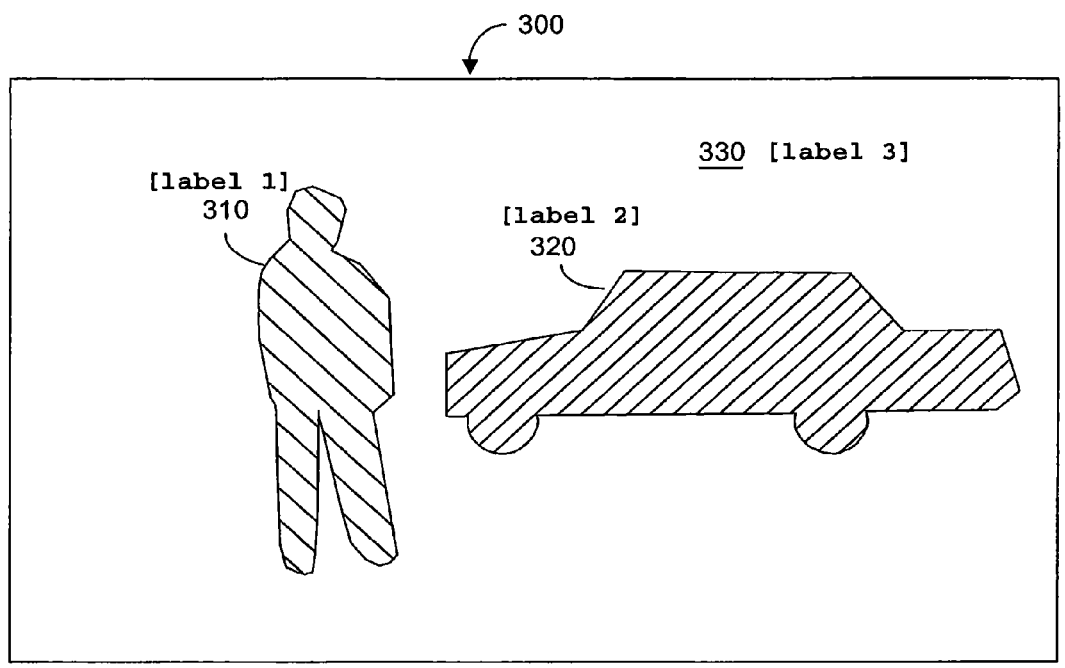
FIG. 4A depicts a depth image comprising three non-adjacent object regions of different depths, showing exemplary segmentation with objects bearing label 1, label 2, and label 3, according to an embodiment of the present invention.

Referring to FIG. 4A, assume that data processed by generic system 200 in FIG. 3A produced image 300, an image comprising three objects: a person 310, a vehicle 320, and background 330. When software 240 implementing an algorithm according to the present invention is executed, e.g., by microprocessor 250, segmentation and identification of the data acquired by system 200 is carried out, according to an embodiment of the present invention.

Software 240 carries out segmentation by labeling pixels comprising image 300 such that connected pixels are assigned the same value. Image 300 in FIG. 4A may be grouped using three labels: person 310 is assigned label 1, vehicle 320 is assigned label 2, and background 330 is assigned label 3. In one embodiment of the present invention, if image 300 is an intensity image, perhaps acquired from a stereographic camera system 210, pixels comprising the image may be grouped according to color. For example if person 310 is wearing a shirt of one color and pants of another, the image of his body could be separated into an upper segment (the shirt) and a lower segment (the pants), with separate labels assigned to each of these two segments. Note that if occlusions are present in the image, e.g., overlapping objects, segment grouping might be unsuccessful as there is no perception of depth.

Assume now that image 300 in FIG. 4A has been acquired with a depth image data acquisition system 210 that can acquire true z-depth data, a system such as shown in FIG. 1 or FIG. 3A, for example. As such, in such acquisition systems, the depth image provides the z-depth value for each pixel comprising the image. Another embodiment of the present invention groups (or segments) portions of the image from such acquisition systems such that neighboring pixels that have similar z-depths are given the same labels. Groups of pixels bearing the same label and that are connected are termed "blobs", where each such blob corresponds to a different object. If image 300 in FIG. 4A is now considered to be a depth image, then it is evident that person 310 is at a different z-distance from system 200 than is vehicle 320 or background 330.

According to embodiments of the present invention, once blobs are defined, they may be modeled or quantized into variously shaped primitives, for example, a circle, a rectangle, or as predefined objects, for example, a person, an animal, a vehicle.

Consider further depth image 300 in FIG. 4A with respect to various embodiments of the present invention. As used herein, a connected component analysis is an imaging method or algorithm by which certain properties and proximities of a pixel are used to group pixels together. For instance, suppose image 300 comprises black and white image pixels. An algorithm or method according to the present invention preferably groups the pixels by labeling connected white or connected black pixels with the same label. A description of such a method as applied to four-neighbor pixel connectivity (e.g., left, right, up, down) will now be given with reference to the exemplary pseudocode depicted in FIG. 5.

In the embodiment exemplified by the pseudocode of FIG. 6, a modified connected component analysis is defined in which values of the z-depth pixels are examined. According to this embodiment, pixels are given the same value as neighboring pixels with similar depth values. Without any limitation, the algorithm pseudocode shown in FIG. 6 exemplifies four-connectivity, although of course eight-connectivity or other measure of connectivity could instead be used. By four-connectivity, it is meant that with respect to a given pixel in array 130 or 130', the algorithm code will inspect the pixel above in the previous row (if any) and the pixel below in the next row (if any), in defining the potential neighborhood of interest. In the boundary conditions, a default assumption for the property of the missing pixels is made.

As shown in FIG. 6, z-depth values for a given pixels (r,c for row,column) in the array is tested to see whether its measured z-depth value is within a threshold depth value compared to its left neighbor. If not less than the threshold, the comparison is repeated with its top neighbor. Pixels whose z-depth values are less than the threshold are tentatively labeled as having the same label value. If the tested pixels still exceed the threshold, a new label is generated and assigned to pixel (r,c). Then z-values of the top and the left pixels are compared. If the z-values are within the threshold, those pixels are labeled as being connected. The test is repeated until pixels in the array are labeled and their connectivities are established. The threshold depth value can be obtained by heuristic methods depending on the type of application.

Figure 4B:
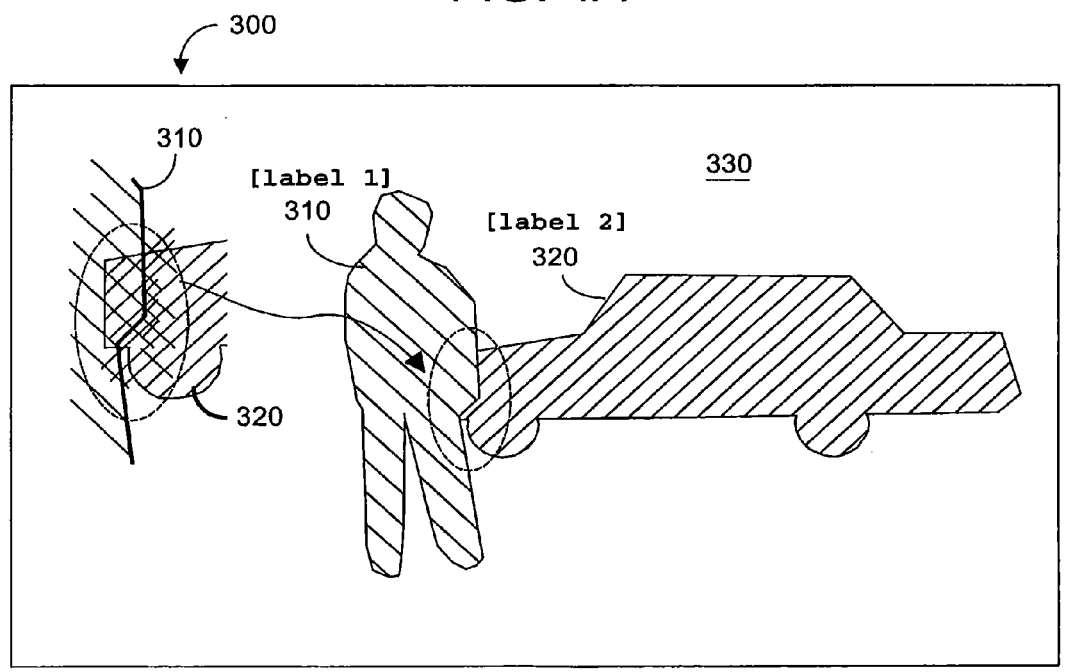
FIG. 4B depicts a depth image comprising object regions of different depths that are adjacent to each other, with the left image portion depicting a magnified view of the transition or overlapping object regions, according to an embodiment of the present invention.
Figure 4C:
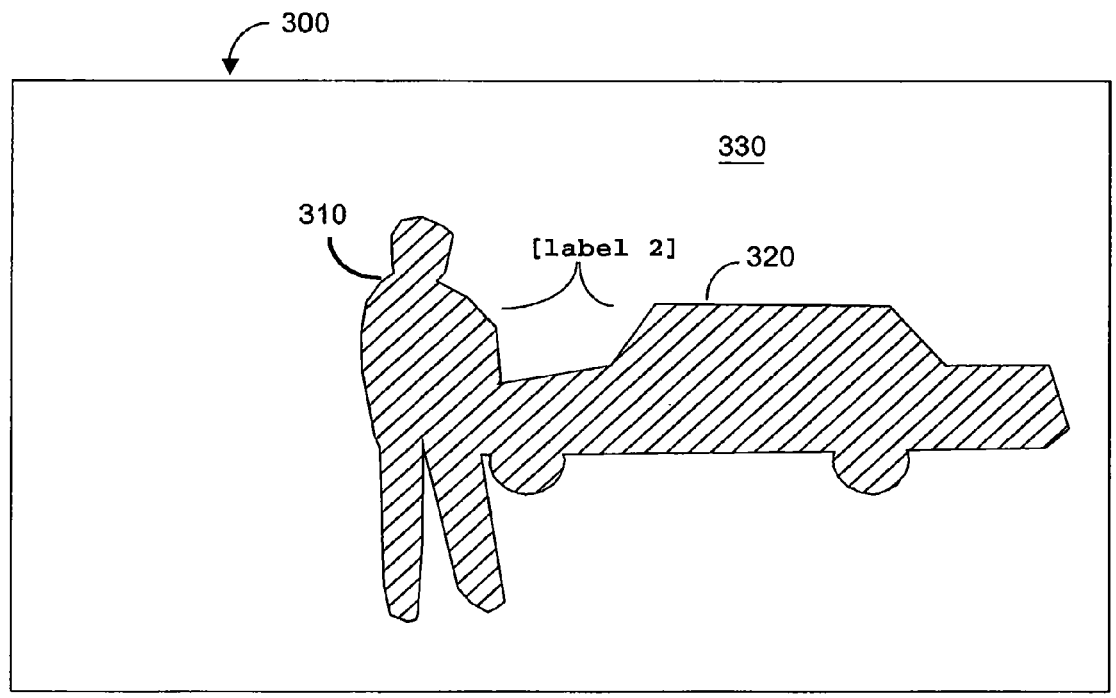
FIG. 4C depicts the depth image of FIG. 4B, after application of a modified connected component analysis algorithm, according to embodiments of the present invention.

The method exemplified in the embodiment of FIG. 6 thus partitions the image into connected regions having similar depth properties. In practice, some depth sensors might produce transition pixels when two regions in the depth image are adjacent to each other but have different z-depth values. FIG. 4B depicts such juxtaposition, with the left-hand portion of the figure providing a zoomed-in depiction of the overlapping transition pixels. As indicated by the overlapping cross-hatching in the zoomed-in region of FIG. 4B, embodiments of the present invention assign some of the transition pixels depth values in between the depth values associated with the two regions in question. The embodiment of the present invention exemplified by FIG. 6 might combine the two regions through the transition pixels, for example by assigning a common label to the entire superimposed image, as shown in FIG. 4C. Thus in FIG. 4C a single object 2 is defined, comprising the human 310 and the motor vehicle 320.

FIG. 7 depicts exemplary pseudocode used in an embodiment of the present invention that takes a different approach to overlapping image objects. More specifically, the embodiment represented by the exemplary pseudocode in FIG. 7 implements a modified connected component analysis that uses a derived property for each pixel as belonging to a number of depth groups.

Figure 8:
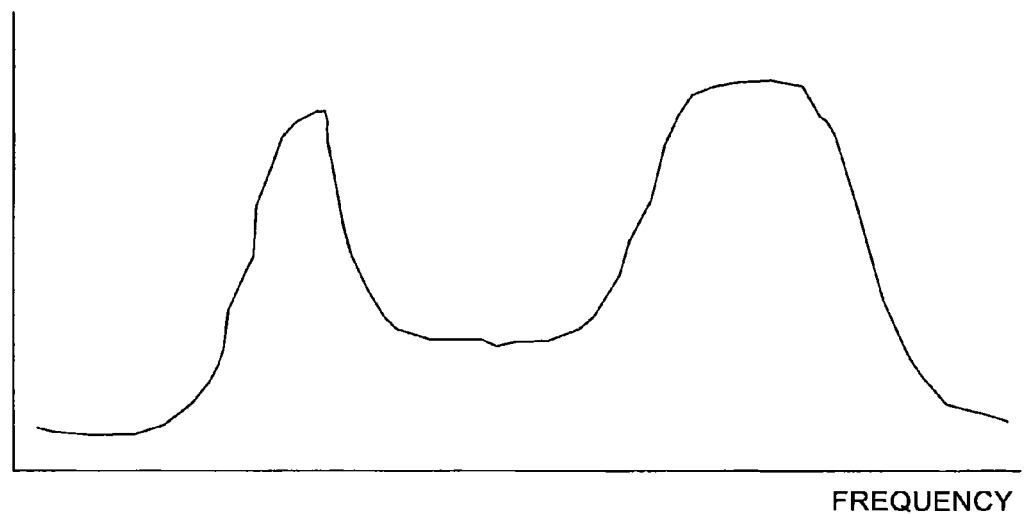
FIG. 8 is an exemplary histogram of the figure of FIG. 4B, using the procedure depicted in FIG. 7, according to an embodiment of the present invention.

Such grouping is carried out by software 240 obtaining a histogram of the z-depth values. The histogram may be stored in memory 230, and preferably is divided into regions using a k-means algorithm, which algorithms are known in the art. For instance, the image of FIG. 4B would have a histogram represented by FIG. 8, which has two distinguishable regions: a left peak representing person 310 (label 1), and a right peak representing vehicle 320 (label 2).

More specifically, according to one embodiment of the present invention, the histogram is grouped into two regions, whereafter image cluster centers are determined using a known procedure, for example, a k-means algorithm as noted above. As indicated by the exemplary pseudocode of FIG. 7, a depthGroupValue image may now be obtained, with each pixel being assigned to one of the depth groups. In FIG. 7, the algorithm of FIG. 6 is modified to use depth group value of a pixel (r,c) instead of its original depth value. FIG. 7 depicts an embodiment of the present invention wherein software 240 (preferably stored in memory 230) and executed by a microprocessor, e.g., microprocessor 250 outputs data in which pixels are pre-grouped into regions of different depth values.

Thus application of the modified connected component algorithm depicted in FIG. 7 can result in an image as shown in FIG. 4B, without considering the zoomed-portion of FIG. 4B.

Applicants's pre-grouping algorithm can encounter difficulty when the image under consideration is a complicated scene having many z-depth regions. In such cases, it is preferable to work on sub-divided regions of the image. For example, in one embodiment of the present invention, pre-grouping of the image can be accomplished by first dividing the image into regions. Without limitation, the image may be divided into several sub-regions, which some or all sub-regions may overlap other sub-regions. In one embodiment, the sub-regions are defined to be rectangles that are equally divided in the image. In this embodiment, pre-grouping is applied within each rectangle, for example (and without limitation) using a k-means algorithm. Next, applicants's connected component analysis is carried out on each sub-region.

The output of the above-described segmentation procedure is a labeled image, for example image 300 shown in FIG. 4B. "Blobs" may be constructed from the labeled image, a blob being a group of pixels with the same label. The exemplary algorithm procedures described herein preferably are used to locate these blobs within an image. In practice, each blob preferably is modeled according to the application requirements. By way of example and without limitation, blobs can be modeled as rectangles, where pixel start row, start column, end row, and end column are defined by the boundary of the blob. For instance, different colors can be used to display rectangles commensurate with the average depth value of the blob. Perhaps a red color could be used for an object that is near, and a green color used for an object that is far. By way of further example, a human might be modeled as rectangles of specific height and weight. Embodiments of the present invention can then advantageously track objects by noting blob movement from image to image. Such image tracking advantageously yields a result more quickly than if pixel-by-pixel tracking were used, image to image. Understandably, blob tracking can substantially reduce the computational requirements to implement a tracking algorithm according to the present invention.

It is understood that memory 230 may store a variety of pre-defined blobs, appropriate to the intended use of overall system 200. For example, system 200 may be disposed in a motor vehicle as part of a warning system, to reduce the likelihood of a collision between the motor vehicle and objects. In such application, predefined models may be stored in memory representing large objects such as another motor vehicle, smaller objects such as a human or animal, column-shaped objects such as a sign post or a traffic light pillar. The ability of the present invention to rapidly recognize such objects from depth and image data acquired by system 210 can enable data from system 200 to alert the operator of the motor vehicle containing the system, as indicated in FIG. 3. If overall system 200 recognizes what the present invention determines to be a human in the path of the motor vehicle containing the system, the data output signal can be used to automatically sound the vehicle's horn, flash headlights, or even to apply the vehicle's brakes.

In other applications, overall system 200 may image occupants of a vehicle containing the system, for example to determine the size of an occupant in the front passenger seat of the vehicle. In such application, memory 230 might store predefined models of objects likely to be in the passenger seat, for example, a large adult, a small adult, a child, a baby, a dog, a package. In an emergency situation, overall system 200 may be used to intelligently deploy an air bag such that the air bag can deploy normally if the object in the front passenger seat is determined from blob analysis to be an adult of suitable size. On the other hand, if overall system 200 determines that from blob analysis that the object in the passenger seat is an infant, the data signal from the overall system may command the air bag not to deploy, where non-deployment is considered the safer alternative for an infant.

The above-described applications must be understood to be merely exemplary. The present invention would also have utility in an intrusion detection system, a factory robotic control system, and so forth.

Modifications and variations may be made to the disclosed embodiments without departing from the subject and spirit of the invention as defined by the following claims.

What is claimed is:

1. A method for use in tracking movement of at least one object in a series of images, comprising:

(a) receiving multiple images including image depth data from an array of pixels acquired by three-dimensional imaging system, each image including z-depth data that comprises a z-depth value of each pixel from at least a fraction of optical energy emitted by the imaging system reflected by at least one object, said image depth data generated by comparing emitted optical energy and the fraction of emitted optical energy detected by said system, and for each of the multiple images:

(a1) examining at least some of said image depth data captured during a single data acquisition;

(a2) using a depth value histogram that records the z-depth value of each pixel of one or more regions, forming segments by grouping together those of said pixels whose acquired said data captured at step (a1) have at least one common characteristic selected from a group consisting of depth distance, depth distance change, object size, and object shape, and assigning pixels in the group a single image cluster center having a depth group value, where the single image cluster center is the geometric center of said group of pixels;

(a3) assigning on a per-segment basis a label to pixels comprising each of said segments formed in step (a2), the pixels so labeled enabling recognition of said at least one object with image depth data; and (b) tracking motion of the at least one object relative to the system.

2. The method of claim 1 wherein said receiving includes acquiring, in said array of pixels, intensity data; and step (a2) includes forming segments by grouping together pixels based upon their acquired intensity data.

3. The method of claim 1 wherein for each of the multiple images, the method further includes steps:

(a4) providing at least one pre-defined blob;

(a5) examining said segments formed in step (a2) to determine presence in said image data of a blob matching a pre-defined blob provided at step (a4); and (a6) providing for output a signal commensurate with detection of a recognized pre-defined blob in said image data.

4. The method of claim 1 wherein step (a2) includes forming segments by grouping together pixels based upon their acquired z-depth data, wherein pixels representing an overlapping portion of objects in said image data are assigned a single label.

5. The method of claim 1 wherein step (a2) includes forming segments by grouping together pixels based upon their acquired z-depth data, wherein pixels representing an overlapping portion of objects in said image data are assigned intermediate values associated with said objects.

6. The method of claim 1 wherein said step (b) comprises tracking movement of said at least one object by noting movement of commonly labeled pixels.

7. The method of claim 1 wherein the method includes tracking movement of at least two objects, and wherein the three-dimension imaging system comprises a time-of-flight imaging system.

8. An image-analyzing system for tracking objects based on image data, the system including:

a three-dimensional imaging system having an emitter of optical energy, an array of pixels receiving at least a fraction of the emitted optical energy reflected by at least one object;

a depth image data acquisition system operable to generate said image depth data by comparing emitted optical energy and detected optical energy by said array of pixels; and a processor and memory, the memory including code operable to instruct the processor to track movement of the at least one object by analyzing multiple images, the analyzing including, for each image:

(a) examining at least some of said image depth data captured during a single data acquisition;

(b) forming segments by grouping pixels in each image having a depth distance within a threshold distance from each other and assigning pixels in the group a single image cluster center having a depth group value, where the single image cluster center is the geometric center of said group of pixels, and wherein each pixel in the group is assigned the depth group value of the image cluster center;

(c) assigning on a per-segment basis a label to pixels comprising each of said segments formed to enable recognition of said at least one object with a single acquisition of image depth data; and (d) for the multiple images, tracking movement of said at least one object by noting movement of commonly labeled pixels.

9. The image-analyzing system of claim 8 wherein the memory is operable to store at least one pre-defined blob comprising a set of commonly labeled pixels; and code instructing the processor to:

compare said segments formed for each image with contents of said memory to determine presence in said image data of a blob matching a pre-defined blob stored in said memory; and provide an output signal commensurate with detection of a recognized pre-defined blob in said image data.

10. The image-analyzing system of claim 9 further including a capability to track at least two objects.

11. The image-analyzing system of claim 8 wherein said three-dimensional imaging system is selected from a group consisting of (i) a time-counting time-of-flight system, and (ii) a time-of-flight system employing phase-shift z-depth measurement.

12. The image-analyzing system of claim 9, wherein:

said array of pixels is further configured to acquire intensity data in a single acquisition of image depth data; and said forming segments by grouping is performed based upon at least one pixel characteristic selected from a group consisting of intensity data acquired by said pixels, z-depth data acquired by said pixels, and z-depth acquired data using pre-determined z-depth values.

13. The image-analyzing system of claim 9, wherein said forming segments by grouping includes grouping together pixels that are within a number k of neighboring pixels, where k is selected from a group consisting of k=4 and k=8.

14. The image-analyzing system of claim 9, wherein said forming segments by grouping includes grouping together pixels based upon their acquired z-depth data, wherein pixels representing an overlapping portion of objects in said image data are assigned a single label.

15. The image-analyzing system of claim 9, wherein said forming segments by grouping includes grouping together pixels based upon their acquired z-depth data, wherein pixels representing an overlapping portion of objects in said image data are assigned intermediate values associated with said objects.

16. The image-analyzing system of claim 9, wherein said forming segments by grouping includes grouping together pixels based upon their acquired z-depth data, and does so in a manner selected from a group consisting of (i) pre-grouping pixels based upon a histogram record of z-depth values of pixels in said array, and (ii) pre-grouping pixels based upon their acquired z-depth data, wherein pixels are pre-grouped based upon a histogram record of z-depth values of pixels in said array, where said histogram is divided into at least two sub-regions and image cluster centers are determined such that each relevant pixel of said pixels in said array is assigned to a z-depth-determined group.

17. A computer readable hardware storage device including instructions causing a microprocessor to track movement of at least one object in a series of images, the instructions comprising:

(a) receiving multiple images including image depth data acquired by three-dimensional imaging system, image depth data comprising a z-depth value of each of a plurality of pixels, and for each of the multiple images:
(a1) examining at least some of said image depth data;
(a2) using a depth value histogram of one or more regions, wherein the depth value histogram records the z-depth values of pixels in the one or more regions, forming segments by grouping together those of pixels in the image data whose acquired said data captured at step (a) have at least one common characteristic selected from a group consisting of depth distance, object size, and object shape, and assigning pixels in the group a single image cluster center having a depth group value, where the single image cluster center is the geometric center of said group of pixels, and wherein each pixel in the group is assigned the depth group value of the image cluster center;
(a3) assigning on a per-segment basis a label to pixels comprising each of said segments formed in step (a2), the pixels so labeled enabling recognition of said at least one object with an acquisition of image depth data; and (b) tracking motion of the at least one object relative to the system over the multiple images.

18. The tangible computer readable storage device of claim 17 wherein the step of tracking is performed by noting movement of commonly labeled pixels.

19. The tangible computer readable storage device of claim 18 further including instructions comprising:

storing in a memory at least one pre-defined blob comprising a set of commonly labeled pixels;

comparing said segments formed for each image with contents of said memory to determine presence in said image data of a blob matching a pre-defined blob stored in said memory; and providing an output signal commensurate with detection of a recognized pre-defined blob in said image data.

20. The computer readable storage device of claim 19 further including tracking at least two objects.

* * * * *